(12) United States Patent
Nikayin et al.

(10) Patent No.: US 7,360,745 B2
(45) Date of Patent: Apr. 22, 2008

(54) METAL STUD BRACKET

(75) Inventors: David Nikayin, Los Angeles, CA (US); Redwald Villanueva, Los Angeles, CA (US)

(73) Assignee: Orbit Industries, Inc., Los Angeles, CA (US)

( * ) Notice: Subject to any disclaimer, the term of this patent is extended or adjusted under 35 U.S.C. 154(b) by 38 days.

(21) Appl. No.: 11/224,827

(22) Filed: Sep. 12, 2005

(65) Prior Publication Data
US 2007/0057130 A1    Mar. 15, 2007

(51) Int. Cl.
*A47B 96/06*    (2006.01)
*A47G 29/00*    (2006.01)

(52) U.S. Cl. .............................. 248/216.1; 248/231.81; 174/58

(58) Field of Classification Search ............. 248/216.1, 248/216.4, 217.2, 217.3, 906, 205.1, 231.81, 248/228.7; 174/48, 58
See application file for complete search history.

(56) References Cited

U.S. PATENT DOCUMENTS

| | | | | |
|---|---|---|---|---|
| 2,972,494 A | * | 2/1961 | Dominic | 403/400 |
| 3,131,447 A | * | 5/1964 | Tinnerman | 248/231.81 |
| 3,536,281 A | * | 10/1970 | Attore et al. | 248/73 |
| 3,606,223 A | | 9/1971 | Havener | 248/205 |
| 3,730,466 A | | 5/1973 | Swanquist | 248/216 |
| 3,780,209 A | | 12/1973 | Schuplin | 174/51 |
| 3,804,359 A | * | 4/1974 | Cumber | 248/205.1 |
| 3,977,640 A | | 8/1976 | Arnold et al. | 248/205 |
| 4,214,668 A | * | 7/1980 | Neff et al. | 220/3.3 |
| 4,362,284 A | | 12/1982 | Bolante | 248/205 |
| 4,971,280 A | | 11/1990 | Rinderer | 248/229 |
| 5,004,199 A | | 4/1991 | Suk | 248/231.8 |
| 5,408,045 A | * | 4/1995 | Jorgensen et al. | 174/58 |
| 6,354,543 B1 | * | 3/2002 | Paske | 248/68.1 |
| 6,389,658 B1 | * | 5/2002 | Pfaller et al. | 24/545 |
| 6,956,172 B2 | * | 10/2005 | Dinh | 174/58 |
| 7,073,757 B2 | * | 7/2006 | Johnson et al. | 248/205.1 |
| 7,090,174 B2 | * | 8/2006 | Korczak et al. | 248/61 |

\* cited by examiner

*Primary Examiner*—Anita M. King
(74) *Attorney, Agent, or Firm*—Paul J. Backofen, Esq.; Crockett & Crockett

(57) ABSTRACT

A bracket according to the present disclosure provides a support mechanism for securing one or more electrical boxes to metal construction elements such as metal studs. The paired spring arm design permits the bracket to be oriented in any useful way and frictionally secured to metal studs of varying dimensions.

9 Claims, 3 Drawing Sheets

METAL STUD BRACKET

FIELD OF THE INVENTION

The inventions described below relate the field of electrical construction components and more specifically to brackets for securing electrical boxes to metal construction studs.

BACKGROUND OF THE INVENTIONS

Conventional wood frame construction techniques are often adapted to metal frame construction. The technique of nailing an electrical box to a wooden stud does not translate well to metal frame construction.

Conventional metal frame brackets generally only permit the securing of a single box to a bracket and thus prevent collocation of multiple boxes.

What is needed is a bracket for adjustably securing one or more electrical boxes to metal studs.

SUMMARY

The bracket described below provides a support mechanism for securing one or more electrical boxes to metal construction elements such as metal studs. The paired spring arm design permits the bracket to be oriented in any useful way and frictionally secured to metal studs of varying dimensions.

Metal stud brackets according to the present disclosure include one or more pair of resilient arms to frictionally engage metal studs between each pair of resilient arms. Using two or more pair of resilient arms provides a very stable attachment to the metal stud.

A metal stud bracket as disclosed includes two parallel flanges that permit attachment of two electrical boxes on either side of a single metal stud at the same height, or a known offset. This simplifies subsequent construction tasks such as hanging sheetrock. Additionally multiple boxes on a single bracket may permit separate circuits to be collocated and secured to a single bracket.

A bracket as disclosed includes a generally rectangular plate having two pair of opposed edges, two generally parallel flanges joined to the plate, each flange joined along one edge of a pair of the two pair of opposed edges, two or more pair of resilient arms, each resilient arm having a proximal end and a distal end, the proximal end of each arm of a pair of resilient arms hingably attached along the distal edge of each of the two generally parallel flanges, with the distal end of each resilient arm inclined toward the plate, and two or more frictional engagement elements formed on each resilient arm.

DETAILED DESCRIPTION OF THE INVENTIONS

Figure 1:
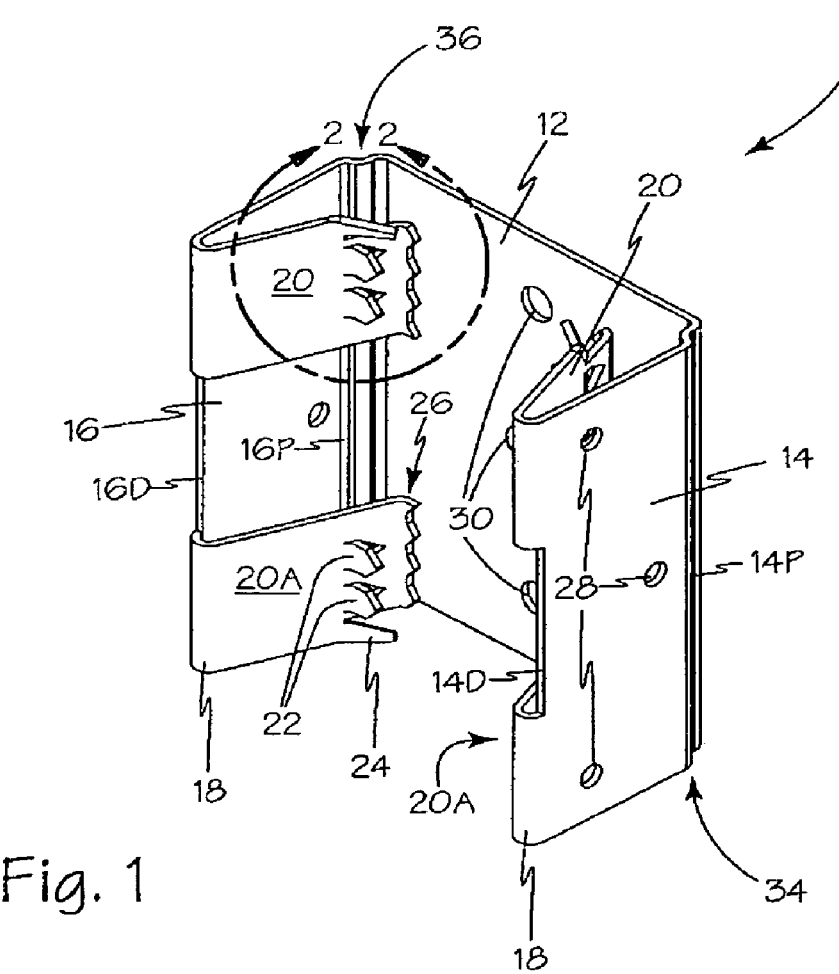
FIG. 1 is an isometric view of a bracket according to the present disclosure.
Figure 5:
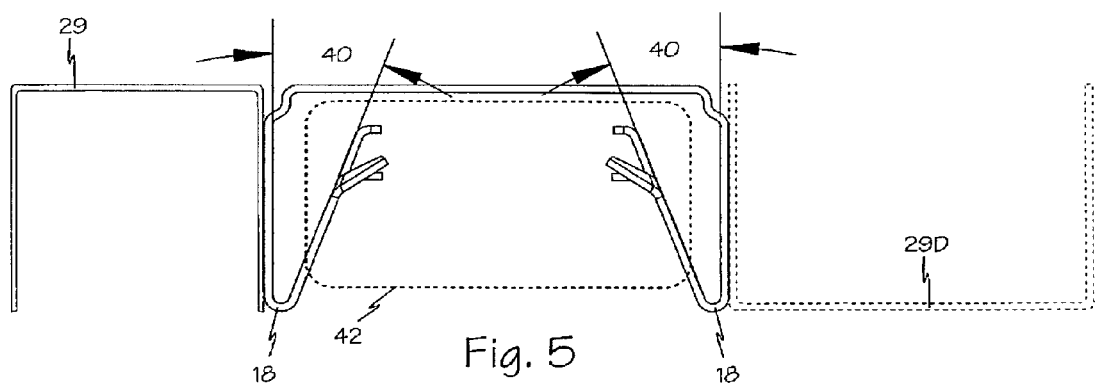
FIG. 5 is a top view of the bracket of FIG. 1.

In FIG. 1, bracket 10 includes a generally rectangular plate 12 joining first flange 14 and second flange 16. First flange 14 and second flange 16 each have a proximal and distal edge, 14P and 14D, 16P and 16D respectively. First flange 14 and second flange 16 are generally perpendicular to plate 12 and the proximal edge of each flange, 14P and 16P, joins plate 12 along complex corners 34 and 36 respectively forming a generally C-shaped channel and an engagement area 42 between the first and second flanges. Plate 12, first flange 14 and second flange 16 also include at least one attachment hole such as attachment holes 28 or holes 30 for securing any suitable element such as electrical boxes 29 and or 29D as shown in FIG. 5, or electrical box 29 of FIG. 6 to the bracket.

Along the distal edge of each flange, distal edges 14D and 16D respectively, is at least one resilient arm such as resilient arms 20. Each resilient arm includes a hinge such as hinge area 18 joining the resilient arm to the distal edge of the flange. Resilient arms are arranged in opposing pairs such as resilient arms 20 and resilient arms 20A.

Figure 2:
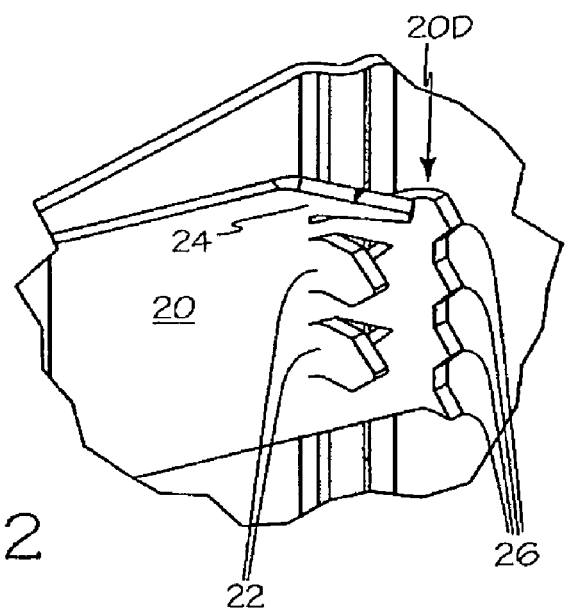
FIG. 2 is a detailed view of a portion of the bracket of FIG. 1 taken along line 2-2.

Referring now to FIG. 2, resilient arms such as resilient arm 20 include one or more frictional engagement elements such as distal teeth 26 along distal edge 20D, secondary arm 24 and one or more primary teeth such as primary teeth 22. Frictional engagement elements may be used to engage wall components such as stud flange 52 as shown in FIG. 6.

Figures 3, 4:
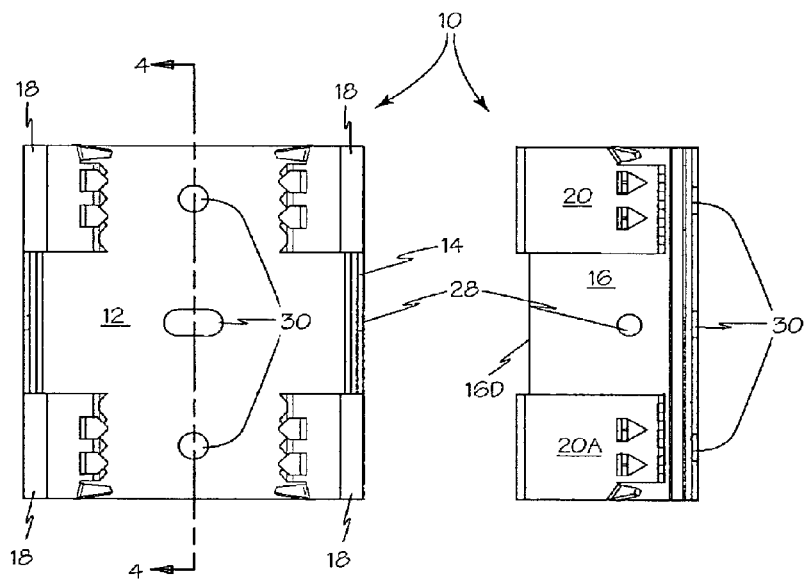
FIG. 3 is a front view of the bracket of FIG. 1.
FIG. 4 is a cutaway side view of the bracket of FIG. 3 taken along line 4-4.

Referring now to FIG. 3 and FIG. 4, plate 12 includes one or more attachment holes such as holes 30 for attaching one or more electrical boxes to bracket 10.

Referring now to FIG. 5, resilient arms such as resilient arms 20 and 20A may form any suitable angle 40 with each flange such as between 10° and 40°. In a currently preferred configuration of bracket 10, angle 40 is between 18° and 22°.

Figure 6:
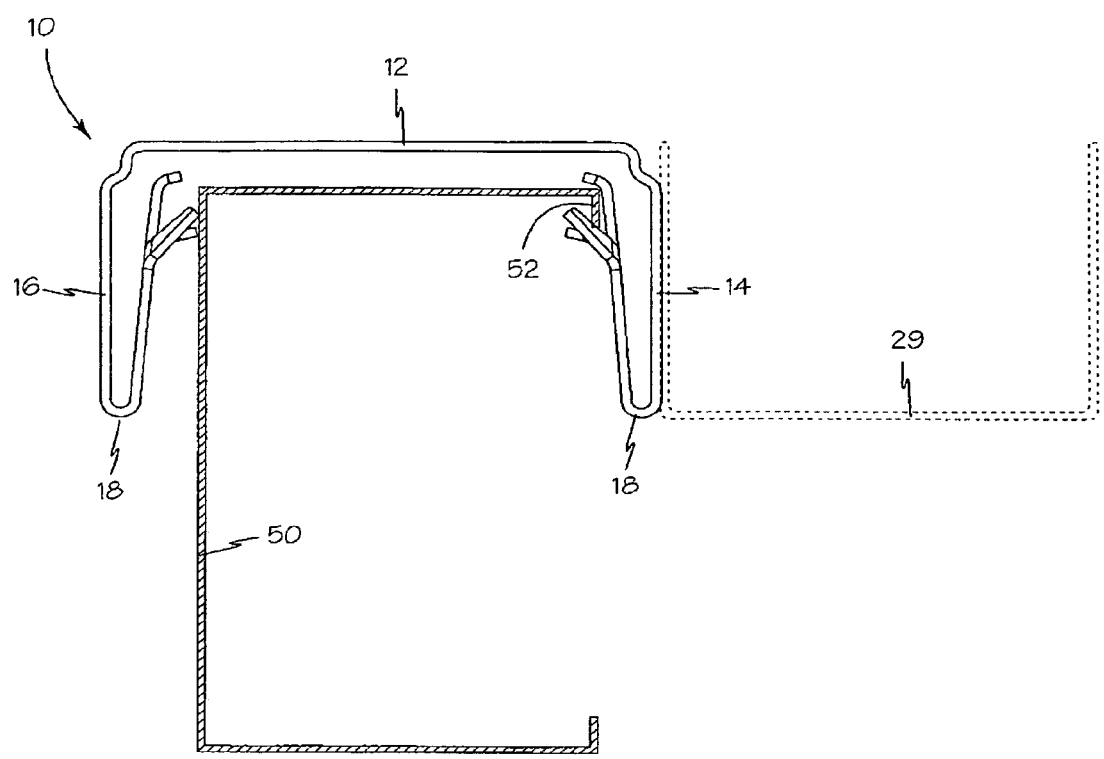
FIG. 6 is a top view of the bracket of FIG. 1 engaging a metal stud.

Referring now to FIG. 6, bracket 10 may engage any suitable metal building component such as metal stud 50. Each resilient arm is compressed to its respective flange enabling metal stud 50 to be frictionally engaged between respective pairs of resilient arms such as resilient arm pair 20 and resilient arm pair 20A.

Thus, while the preferred embodiments of the devices and methods have been described in reference to the environment in which they were developed, they are merely illustrative of the principles of the inventions. Other embodiments and configurations may be devised without departing from the spirit of the inventions and the scope of the appended claims.

We claim:

1. A bracket comprising:

a generally rectangular plate having two pair of opposed edges;

two generally parallel flanges, each flange having a proximal edge and a distal edge, the proximal edges of the flanges joined to the plate, each flange joined along one edge of a pair of the two pair of opposed edges;

two or more pair of resilient arms, each resilient arm having a proximal end and a distal end, the proximal end of each arm of a pair of resilient arms hingably attached along the distal edge of each of the two generally parallel flanges, with the distal end of each resilient arm inclined toward the plate; and two or more frictional engagement elements formed on each resilient arm, the frictional engagement elements of each resilient arm inclined away from the flange to which the resilient arm is attached.

2. The bracket of claim 1 wherein each resilient arm of a pair of resilient arms form an angle between 10 and 40 degrees with their respective flange.

3. The bracket of claim 1 wherein each resilient arm of a pair of resilient arms form an angle between 18 and 22 degrees with their respective flange.

4. The bracket of claim 1 further comprising:

an electrical box secured to each of the two generally parallel flanges.

5. A bracket comprising:

a generally rectangular plate having two pair of opposed edges;

two generally parallel flanges, each flange having a proximal edge and a distal edge, the proximal edges of the flanges joined to the plate, each flange joined along one edge of a pair of the two pair of opposed edges;

two or more pair of resilient arms, each resilient arm having a proximal end and a distal end, the proximal end of each arm of a pair of resilient arms hingably attached along the distal edge of each of the two generally parallel flanges with the distal end of each resilient arm inclined toward the plate and including one or more teeth, one or more primary teeth formed in the resilient arm, and one or more secondary arms formed along the resilient arm, the primary teeth and secondary arms of each resilient arm inclined away from the flange to which the resilient arm is attached.

6. The bracket of claim 5 wherein each resilient arm of a pair of resilient arms form an angle between 10 and 40 degrees with their respective flange.

7. The bracket of claim 5 wherein each resilient arm of a pair of resilient arms form an angle between 18 and 22 degrees with their respective flange.

8. The bracket of claim 5 further comprising:

an electrical box secured to one of the two generally parallel flanges.

9. The bracket of claim 5 further comprising:

an electrical box secured to each of the two generally parallel flanges.

* * * * *